J. A. ANDERSON.
LINE KNOTTER AND TIGHTENER.
APPLICATION FILED AUG. 26, 1916.
1,237,599.
Patented Aug. 21, 1917.
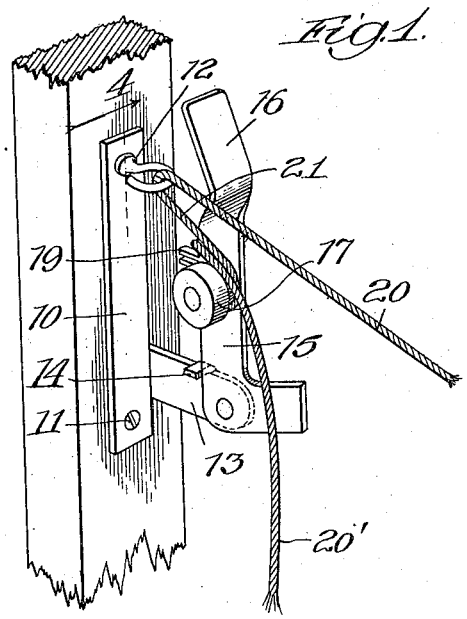
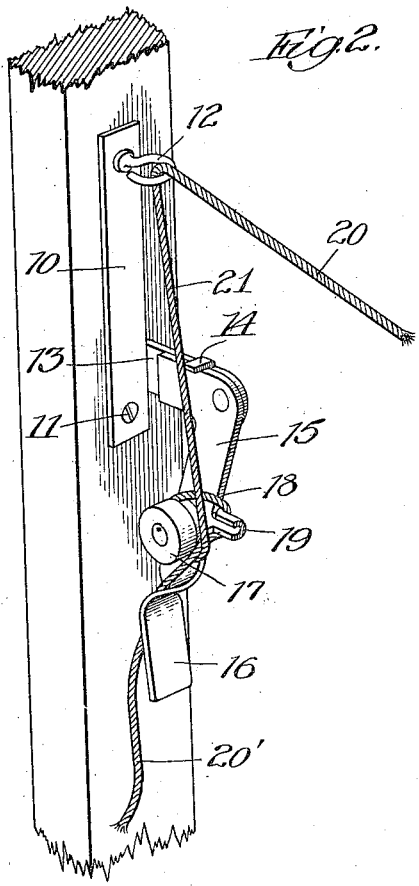
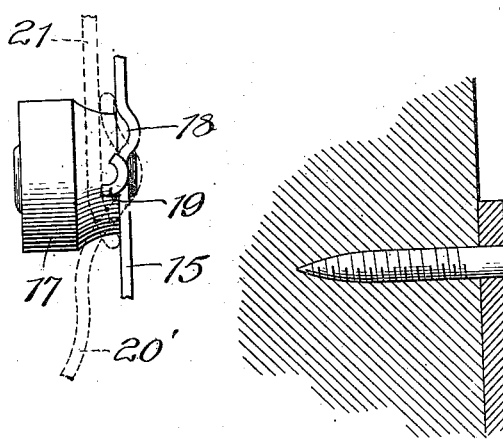
Witnesses:
Inventor:
Jerry A. Anderson,
By Dyrenforth, Lee, Chritton and Wiles,
Att'ys

UNITED STATES PATENT OFFICE.

JERRY A. ANDERSON, OF OAK PARK, ILLINOIS.

LINE KNOTTER AND TIGHTENER.

1,237,599. Specification of Letters Patent. Patented Aug. 21, 1917.

Application filed August 26, 1916. Serial No. 116,983.

*To all whom it may concern:*

Be it known that I, JERRY A. ANDERSON, a citizen of the United States, residing at Oak Park, in the county of Cook and State of Illinois, have invented a new and useful Improvement in Line Knotters and Tighteners, of which the following is a specification.

My invention relates to certain new and useful improvements in means for fastening or knotting and forcibly stretching or tightening lines, such, for instance, as clothes lines. The invention will be more fully understood from the following detailed description of a specific embodiment thereof, taken in connection with the accompanying drawings, in which—

Figure 1 is a perspective view of my knotter and tightener secured in place on a suitable support; Fig. 2 is a similar view showing the device in the locked position; Fig. 3 is an enlarged detail of the knotter and Fig. 4 is an enlarged section on the line 4 of Fig. 1.

Referring more particularly to the drawings, the numeral 10 designates the base plate of my device which as shown is constructed of a rectangular strip of metal designed to be secured to a suitable support as by the lower screw 11, and the upper hook 12. Adjacent this lower portion the base 10 has formed thereon an outstanding arm 13 which carries a bent ear 14. In the outer end of the arm 13 there is pivoted a lever 15 which is also preferably formed of sheet or plate metal, stamped in the angular form shown, and having its outer end twisted to provide a handle portion 16.

Intermediate the length of the lever 15 and on that face thereof which is adjacent the base plate 10, there is secured a drum 17 of the contour shown in Fig. 3. The lever 15 has pressed therein a recess or notch 18 extending from one edge inwardly and approximately in a line of tangency to the drum, and adjacent the notch or recess 18, there is a stud 19 which may also be formed integrally with the arm 15 and which extends radially of the drum.

In the use of my apparatus the base plate 10 will be secured to a suitable support, the eye 12 being used for securing the upper end, and a line, such as the line 20 shown in the drawings, will be engaged over the hook, and the lever 16 being in the position shown in Fig. 1, the line will be led downwardly over the outer face of the drum 17, turning inwardly around the drum as far as the tangential notch 18 at which point it will be looped around the right-hand face of the stud 19, and the free end again pulled downwardly over the drum, as represented at $20^1$. The parts being in the position shown in Fig. 1 of the drawing, the free end of the line $20^1$ will be pulled as tight as may be conveniently done by hand, the line sliding around the drum and through the hook 12 as the slack is taken up. While the free end of the line is still held, the lever 15 will be grasped and moved outwardly and downwardly, and in such movement, the line will be forcibly stretched or tightened. The frictional resistance of the line upon the drum 17 and stud 19 is so great that a very small force on the free end $20^1$ will be sufficient to hold the line and prevent it from slipping during the first part of the downward movement of the lever 16. Before the lever has reached a horizontal position, however, that portion of the line which is designated 21 and which extends between the hook 12 and the drum 17, will have crossed the free end $20^1$ of the line just where the latter crosses the drum. From this point on, therefore, the free end of the line will be automatically locked or knotted and may be released during the final stretching movement. At the lower limit of movement of the arm, as determined by the engagement of the angular foot thereof with the stop 14, the rope section 21 extends inward of the radius of the arm, and the parts are therefore automatically locked in the position shown in Fig. 2.

The stretching operation above described may be repeated as often as is necessary to take up all slack in the line, the free end $20^1$ of the rope being pulled with one hand, while the lever is in an approximately horizontal position or in a position above the horizontal, and the drum and its associated stud acting as a species of ratchet connection by which the slack may be alternately taken up by direct pull on the free end $20^1$ and the rope forcibly stretched by the action of the lever arm 15.

My apparatus is of such a form that it may be readily constructed of stamped or pressed plate-metal, the parts being so arranged that all considerable stresses are taken in the proper direction for the employment of this flat-metal construction. It should be particularly noted that the construction illustrated is capable of being used with the line 20 extending either in the plane of movement of the lever 15 or in a plane at right-angles thereto, the securing hook 12 for the base plate serving to change the direction of the line as required without affecting the operation. My apparatus is therefore capable of practically universal application.

While I have shown and described in considerable detail one specific embodiment of my invention, it will be understood that this description is illustrative only and for the purpose of making clear the nature and objects of the invention and that I no not regard the invention as limited to such details, nor to any of them, except in so far as such limitations are included within the terms of the following claims, in which it is my intention to claim all novelty inherent in my invention as broadly as is permissible in view of the prior art.

What I regard as new and desire to secure by Letters Patent, is:—

1. A line tightening device of the class described comprising a base portion adapted to be secured upon a support, means for changing the direction of a line carried by one end of said base, a pivot carried by said support and spaced outwardly from the opposite end thereof, a swinging arm carried by the said pivot for movement toward and away from the line-direction changing-means, a stop for limiting the movement of said lever, said stop being so located as to permit the lever to pass the outer dead center in its movement away from the direction-changing means, and means for securing the line to be tightened to said lever.

2. A line stretcher comprising, in combination, a flat-metal base portion, a hook carried by one end of said base portion and adapted to serve as a line-direction changing-means, an arm extending outwardly from the other end of said base portion, a lever pivoted to said arm for swinging toward and away from said hook, a line drum mounted on one face of the said lever, and a stud carried by the lever and extending radially of the line drum, whereby there is formed a line-locking device, and a stop operating beyond the outer dead center for limiting the swinging movement of the said lever away from the said hook.

3. A plate-metal line stretcher comprising a flat metal base portion carrying at one end a line-direction changing-means, an integral arm extending outwardly from the opposite end of said base portion, a plate-metal lever pivoted to the said arm for swinging movement in its own plane, the free end of said lever being twisted to form a transversely extending handle portion, a rope lock mounted on the said lever intermediate the length of the same, and a stop operating beyond the outer dead center for limiting the movement of said lever away from the said line-direction changing-means.

JERRY A. ANDERSON.

Copies of this patent may be obtained for five cents each, by addressing the "Commissioner of Patents, Washington, D. C."